(12) United States Patent
Schmidt

(10) Patent No.: US 9,269,200 B2
(45) Date of Patent: Feb. 23, 2016

(54) REAL-TIME EVALUATION OF MACHINE PERFORMANCE FOR FLEET MANAGEMENT

(75) Inventor: Lee A. Schmidt, Newton, KS (US)

(73) Assignee: AGCO Corporation, Duluth, GA (US)

( * ) Notice: Subject to any disclaimer, the term of this patent is extended or adjusted under 35 U.S.C. 154(b) by 842 days.

(21) Appl. No.: 13/341,475

(22) Filed: Dec. 30, 2011

(65) Prior Publication Data

US 2012/0253744 A1    Oct. 4, 2012

Related U.S. Application Data

(60) Provisional application No. 61/428,693, filed on Dec. 30, 2010, provisional application No. 61/428,695, filed on Dec. 30, 2010, provisional application No. 61/428,692, filed on Dec. 30, 2010.

(51) Int. Cl.

| | |
|---|---|
| *G01D 7/02* | (2006.01) |
| *G06Q 99/00* | (2006.01) |
| *G01D 21/00* | (2006.01) |
| *G06F 17/40* | (2006.01) |
| *G06F 19/00* | (2011.01) |
| *G07C 5/00* | (2006.01) |
| *G06F 11/30* | (2006.01) |
| *G07C 5/08* | (2006.01) |

(52) U.S. Cl.
CPC *G07C 5/008* (2013.01); *G01D 7/02* (2013.01); *G06F 11/3065* (2013.01); *G07C 5/085* (2013.01); *G01D 21/00* (2013.01); *G06F 17/40* (2013.01); *G06F 19/00* (2013.01); *G06Q 99/00* (2013.01)

(58) Field of Classification Search
CPC .... G07C 5/008; G07C 5/0808; G07C 5/0841; G07C 5/12
USPC .................................................. 702/182, 188
See application file for complete search history.

(56) References Cited

U.S. PATENT DOCUMENTS

| | | | | |
|---|---|---|---|---|
| 2,883,255 | A * | 4/1959 | Anderson | 346/34 |
| 3,321,613 | A * | 5/1967 | Searle | 702/182 |
| 3,362,217 | A * | 1/1968 | Rush et al. | 73/112.01 |
| 4,703,325 | A * | 10/1987 | Chamberlin et al. | 340/520 |
| 5,528,499 | A * | 6/1996 | Hagenbuch | 701/50 |
| 6,941,208 | B2 * | 9/2005 | Mahoney et al. | 701/50 |
| 7,397,392 | B2 * | 7/2008 | Mahoney et al. | 340/988 |
| 7,899,591 | B2 * | 3/2011 | Shah et al. | 701/29.4 |
| 8,630,768 | B2 * | 1/2014 | McClellan et al. | 701/36 |
| 8,831,825 | B2 * | 9/2014 | Shah et al. | 701/36 |
| 9,067,565 | B2 * | 6/2015 | McClellan et al. | |

(Continued)

*Primary Examiner* — Edward Cosimano

(57) ABSTRACT

A real-time performance evaluation system can compare machine performance to a performance standard. A Fleet Operations Subsystem (FOS) can determine a machine status such as Parked, Idle, Working, Travel or Turning. The FOS can be configured to determine machine performance by determining the amount of time spent in each status. The performance can be compared to predetermined performance standards, for example a minimum number of hours spent working, or a maximum number of hours spent idle. A performance score can be generated based on the comparison. A report of the performance evaluation can be provided. A report can be in the form of a performance marker graphic on a visual display. The performance marker can represent the performance score. The performance marker can be in the form of an alarm symbol for a poorly performing machine. The system provides an operator or manager the opportunity to improve machine performance.

16 Claims, 11 Drawing Sheets

(56) References Cited

U.S. PATENT DOCUMENTS

| | | | |
|---|---|---|---|
| 2002/0107624 A1* | 8/2002 | Rutz ............................. | 701/50 |
| 2002/0116107 A1* | 8/2002 | Mahoney et al. ............. | 701/50 |
| 2004/0021563 A1* | 2/2004 | Mahoney et al. ............. | 340/521 |
| 2005/0081410 A1* | 4/2005 | Furem et al. .................. | 37/379 |
| 2005/0085973 A1* | 4/2005 | Furem et al. .................. | 701/50 |
| 2005/0096810 A1* | 5/2005 | Mahoney et al. ............. | 701/29 |
| 2005/0146428 A1* | 7/2005 | Mahoney et al. ............. | 340/521 |
| 2006/0250281 A1* | 11/2006 | Mahoney et al. ............. | 340/988 |
| 2007/0027593 A1* | 2/2007 | Shah et al. .................... | 701/30 |
| 2008/0255722 A1* | 10/2008 | McClellan et al. ............ | 701/35 |
| 2008/0262670 A1* | 10/2008 | McClellan et al. ............ | 701/29 |
| 2011/0130914 A1* | 6/2011 | Shah et al. .................... | 701/30 |
| 2011/0160994 A1* | 6/2011 | Schmidt et al. ............... | 701/200 |
| 2012/0253709 A1* | 10/2012 | Schmidt et al. ............... | 702/60 |
| 2012/0253743 A1* | 10/2012 | Schmidt ........................ | 702/182 |
| 2012/0253744 A1* | 10/2012 | Schmidt ........................ | 702/182 |

* cited by examiner

REAL-TIME EVALUATION OF MACHINE PERFORMANCE FOR FLEET MANAGEMENT

RELATED APPLICATIONS

The present application claims the benefit of expired U.S. provisional application entitled "Real-Time Determination of Machine Performance for Fleet Management", having Ser. No. 61/428,693, filed Dec. 30, 2010; of expired U.S. provisional application entitled " Real-Time Evaluation of Machine Performance for Fleet Management", having Ser. No. 61/428,695, filed Dec. 30, 2010; of expired U.S. provisional application entitled "Automatic Detection of Machine Performance for Fleet Management", having Ser. No. 61/428, 692, filed Dec. 30, 2010, which are all incorporated herein by reference in their entirety.

FIELD OF INVENTION

This invention pertains generally to methods and systems for supporting agricultural operations, and more particularly to automatic detection systems.

BACKGROUND OF INVENTION

In the agricultural industry, there is a continual effort to increase operator and machine productivity while decreasing operational costs. Accordingly, farmers have embraced larger and more technically advanced machinery, more precise farming techniques and more automated technology to relieve machine operators of many of the tasks associated with cultivating and harvesting agricultural fields. Precision farming enables crop product to be applied under field-specific parameters to optimize and better predict yield based on the particular characteristics of the field. Properly employed, precision farming techniques can reduce product, operator and equipment costs. Similarly, automated guidance systems, relying on geo-positioning satellites for accurate location data, and on user input for designated tasks, can reduce operator error and fatigue, further mitigating costs.

However, while beneficial for assisting particular apparatus maneuvers, such systems may not address other costs and inefficiencies associated with agricultural operations, whether in the context of a particular vehicle and operator, or in the context of managing a fleet of vehicles.

SUMMARY OF INVENTION

Methods and systems for real-time evaluation of machine performance are presented. In an exemplary embodiment, a system can include an apparatus data unit (ADU) configured to receive and transmit apparatus data associated with an agricultural machine, and a fleet operations system configured to receive said apparatus data and evaluate machine performance. In an example embodiment, a fleet operations system (FOS) is part of a fleet management system at a remote location from the ADU, and the ADU is configured for communication with the fleet management system over a communications network, such as a cellular network. In an example embodiment, the FOS can comprise a status determination module for determining machine status, a performance determination module for determining and evaluating machine performance, and a report generation module for generating a report of machine status, performance and an evaluation of performance.

A method of evaluating machine performance can include comparing machine performance with a predetermined performance parameter. A performance parameter can be a predetermined performance standard, such as a maximum or minimum number of hours spent in a particular status, such as working, idle, in transport, parked, and turning, over a predetermined time interval, such as a 24-hour period. A method can further include generating a performance score based on the comparison. By way of example, but not limitation, a performance score can reflect the number of performance parameters satisfied, or alternatively, the number of performance parameters not satisfied. As a further example, it can convey the degree to which a particular performance parameter was missed. A report of machine evaluation can be can be provided to a user, such as a fleet manager. In an exemplary embodiment, the report can be in the form of a performance marker graphic in a visual display, that correlates with a performance score. For a poorly performing machine, a performance marker can be in the form of an alarm or alert symbol that can capture a user's attention on a display screen. Having been alerted, a fleet manager can contact the operator of a poorly performing machine so that adjustments can be made to the machine or its operation. An evaluation report can include evaluations of a plurality of machines to give a fleet manager a quick assessment of overall fleet performance, and provide real-time opportunities to improve performance.

DETAILED DESCRIPTION OF EXAMPLE EMBODIMENTS

As required, example embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of an agricultural vehicle, it will be understood that the present invention is not limited to that particular arrangement. Likewise functions discussed in the context of being performed by a particular module or device may be performed by a different module or device, or combined, without departing from the scope of the claims.

Figure 1:
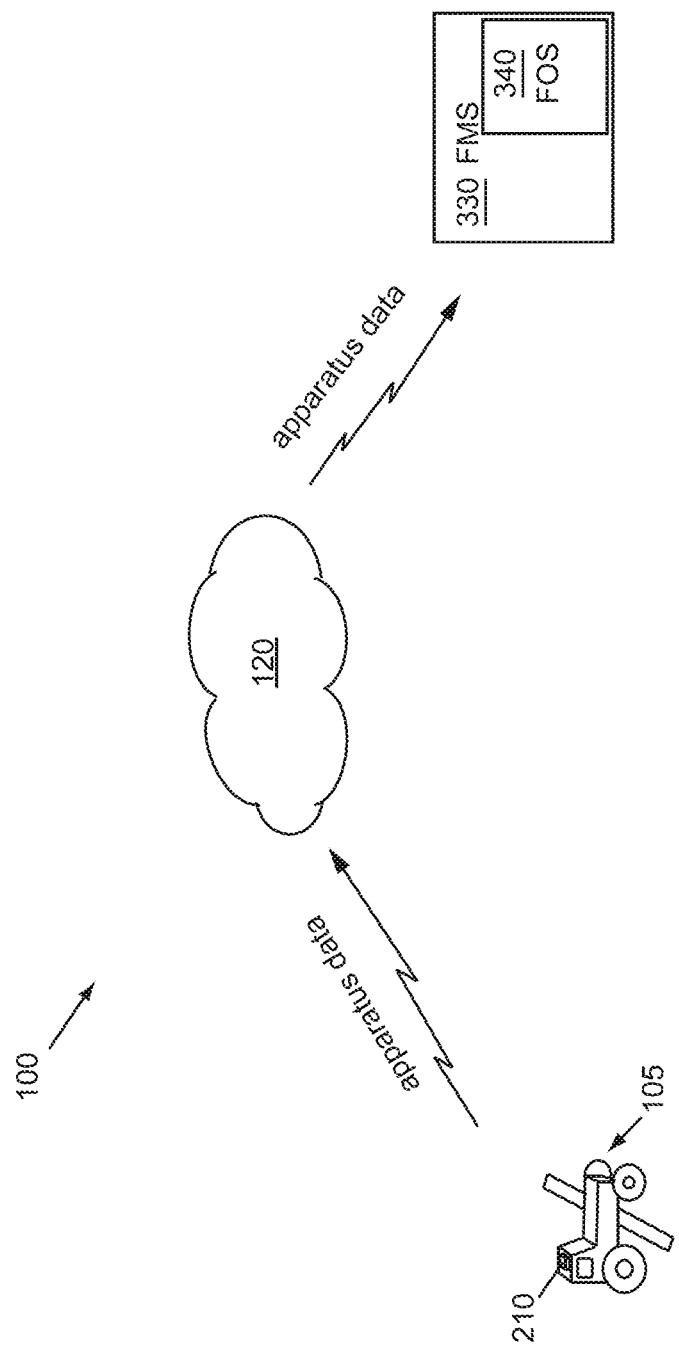
FIG. 1 depicts an example system for automatic detection of machine status.

Referring now to the figures, the present invention will be described in detail. Referring to FIG. 1, an automatic machine status detection system (AMSDS) 100 can include one or more agricultural machines 105 equipped with an apparatus data unit (ADU) 210. The ADU 210 can be configured to provide apparatus data, such as location and apparatus state data, over a communications network 120 to a fleet management system (FMS) 330 equipped with a Fleet Operations System (FOS) 340. Using the received apparatus data, the FOS 340 can be configured to determine a current status for the machine 105. The FOS 340 can further be configured to use a history of machine status to evaluate machine and/or operator performance. In addition, the FOS 340 can be configured to generate a report of machine status and performance for fleet management purposes.

The agricultural machine 105 can be in the form of an agricultural vehicle, by way of example, but not limitation, a combine harvester, tractor, sprayer, or windrower. The machine 105 can be equipped with a variety of different implements, such as a cultivator, a header, a boom, etc. The machine 105 can be configured to perform various agricultural related tasks, such as, but not limited to, harvesting crop, cultivating, applying crop products, irrigating, and the like, using the various implements. The machine 105 and any attached implement may be provided with a variety of sensors, actuators, and other tools to monitor the various states of apparatus and implements at the machine.

The ADU 210 can be embodied as a unit configured to receive input from various apparatus sensors and tools, and further configured to transmit the apparatus data. For example, the ADU 210 can be embodied as a telemetry unit. In an example embodiment, the ADU 210 can comprise a data recorder 202 configured to receive and record apparatus data from a plurality of sources, coupled to a data transmitter 204 configured to transmit apparatus data received at the data recorder.

The ADU 210 can be configured to provide apparatus data to the FMS 330 by any suitable means, by way of example, but not limitation, by communication over the communication network 120, which can include one or more networks, for example a local area network (LAN) and a wide area network (WAN). A wireless communications system, or a combination of wire line and wireless may be utilized to communicate apparatus data. Wireless can be defined as radio transmission via the airwaves. However, other transmission techniques including, but not limited to, infrared line of sight, cellular, microwave, satellite, packet radio, and spread spectrum radio can also be employed.

The FMS 330 can include one or more devices configured for communication over a communications network. For example, one or more computer servers coupled to a modem for communication capability can be included at the FMS 330. The FMS 330 can include one or more dedicated servers, such as an application server configured to process data associated with a particular software application, a verification server configured to determine whether a user is authorized to communicate with the FMS 330, as well as any other servers or other devices required to support an AMSDS 100.

The FMS 330 can include the FOS 340 for determining a status for the machine 105 using apparatus data transmitted by the ADU 210. The FOS 340 can include one or more components or modules that can comprise hardware, software, firmware or some combination thereof. In an example embodiment, a module can be embodied as an application executed at a computing device or server at the FMS 330. The FOS 340 can further be configured to determine the performance of the machine 105 over time, so that a poorly performing machine can be detected, providing a fleet manager or machine operator the opportunity to make adjustments to improve machine and overall fleet performance.

Figure 2:
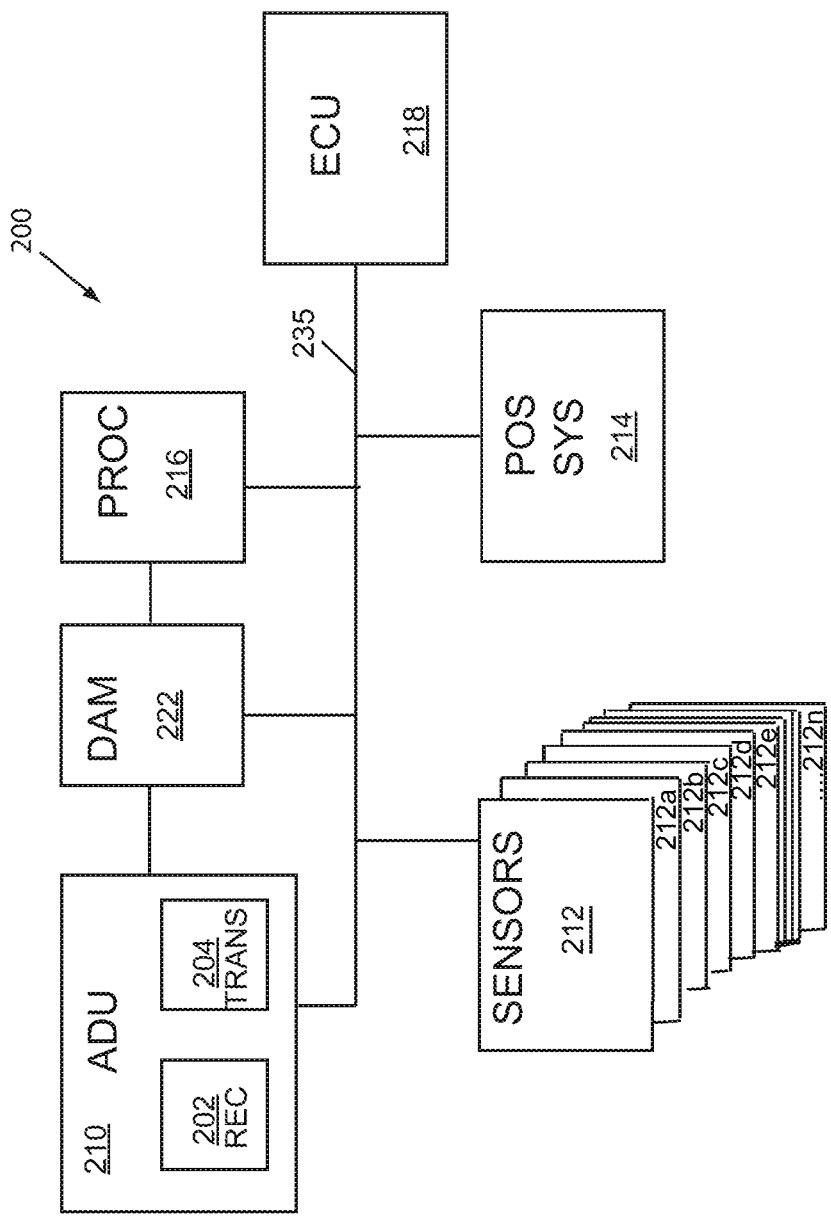
FIG. 2 depicts an example operating environment for a system for automatic detection of machine status.

FIG. 2 shows an example operating environment 200 that can include an ADU 210, one or more sensors 212a, 212b, . . . 212n, where n is variable, a positioning system 214, a processing device 216, and an electronic control unit (ECU) 218. A data acquisition module (DAM) 222 can further be included for coordinating and/or controlling ADU 210 operation. In an example embodiment, the ADU 210 can be in the form of a telemetry unit. The ADU 210 can be configured to receive data from a plurality of sensors 212a, 212b, . . . 212n, as well as other input associated with the agricultural machine 105. In an example embodiment, a sensor 212a can be positioned at a crop bin and configured to provide information regarding the weight or volume of harvested crop collected. By way of example, but not limitation, a sensor 212b can be positioned at a supply container, and configured to provide data representing the volume of consumable product remaining. As a further example, a sensor 212c can provide input associated with the state of a power take-off (PTO) on the agricultural machine 105. The type and location of sensors can vary in accordance with the type of agricultural machine, tool and/or implement. The sensors 212 can comprise mechanical or electrical sensors as well as electronic assemblies or modules. Further non-limiting examples include sensors that measure the height of an implement, machine speed, ignition state, and the like.

It is further contemplated that, in addition to receiving data captured by the sensors 212, the ADU 210 can receive status data from various subsystems or modules at the machine 105. In an illustrative example, the ADU 210 can receive data from an electronic control unit (ECU) 218 configured to control various aspects of an apparatus or an implement. As described in abandoned U.S. patent application Ser. No. 12/648,985 entitled "Auto-Detection of a Field in Fleet Management" filed on Dec. 29, 2009 by Schmidt et al., which is incorporated herein in its entirety by reference, the ECU 218 can be embodied as an autosteer system such as the Auto-Guide™ system manufactured by AGCO® of Duluth, Ga. The ADU 210 can be configured to receive information from the ECU 218 regarding the work state of an apparatus. For example, vehicle speed and direction can be provided by the Auto-Guide™ system, as well as information regarding the type of implement attached and its current position, such as raised or lowered, or engaged or unengaged.

In an example embodiment, the ADU 210 can be configured to receive data directly from various sensors or systems. For example, the components of the example operating environment 200 can be configured to form nodes for a controller area network (CAN) bus 235 that provides serial communication capability between nodes, or, alternatively, can be communicatively coupled by other means. In a further example embodiment, input from various sensors/systems can be received at the processor 216, configured to control and coordinate operation of and interaction among various machine apparatus and components, and provided to the ADU 210 in a compatible format.

The ADU 210 can comprise a data recorder 202 and a data transmitter 204. The data recorder 202 can be configured to record data received at the ADU 210. The data transmitter 204 can be configured to transmit data recorded at the data recorder 202. In an example embodiment, the data transmitter 204 can be configured to transmit to the FMS 330 over the communication network 120.

By way of example, but not limitation, ADU 210 data acquisition and transmission, such as commencement and termination of data recording, the type of data recorded, and the intervals at which apparatus data is received and transmitted to the FMS 330, can be controlled by the DAM 222, which can comprise hardware, software, firmware or some combination thereof. For example, the DAM 222 can be in the form of an application executed at the processor unit 216. In a further example embodiment, the DAM 222 can be embodied as a dedicated device such as, but not limited to, a microprocessor configured to control the ADU 210 operation.

The positioning system 214 can be configured to provide a geographical location for the machine 105. In an example embodiment, the positioning system 214 can include a global positioning system (GPS) or global navigation satellite system (GNSS) receiver configured to receive satellite signals and determine a geographical location therefrom, as known in the art. Input from the positioning system 214 can be used to provide location data, as well as velocity data. In a further embodiment, the ECU 218 can provide machine and/or implement speed and direction data.

Figure 3:
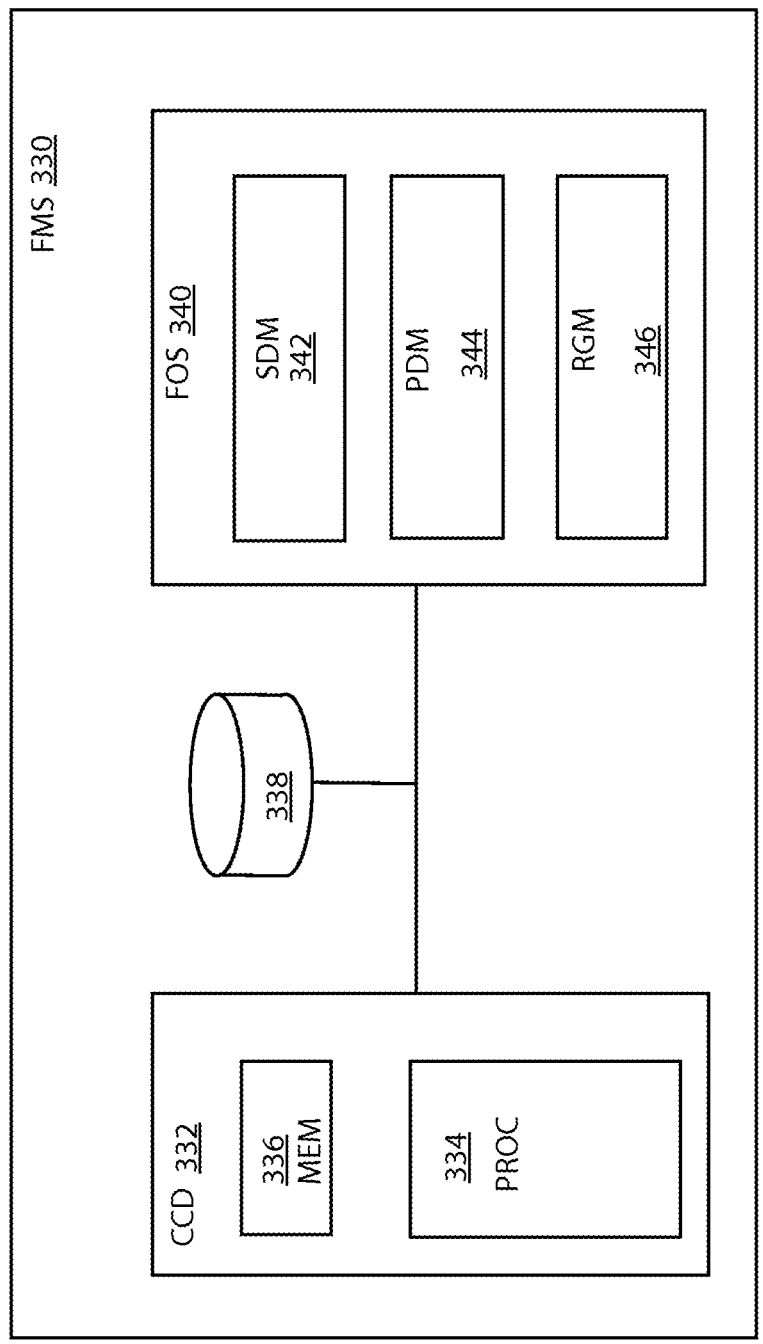
FIG. 3 depicts an example fleet management system (FMS).

In an exemplary embodiment, the FMS 330 can be embodied as depicted in FIG. 3. The FMS 330 can comprise a central computing device (CCD) 332, a database 338 coupled to the CCD 332, and a FOS 340 coupled to the CCD 332 and the database 338. The CCD 332 can comprise a processor 334, a memory 336 that can comprise read-only memory (ROM) for computing capabilities and random access memory (RAM), a removable disc (not shown), and/or other devices with data storage capabilities, and a communications modem (not shown) for communications capabilities. By way of example, but not limitation, the CCD 332 can be implemented using a personal computer, a network computer, a mainframe, or microcomputer-based workstation. The database 338 can be configured to store data in various arrangements, for example in various accessible records. The database 338 can be embodied as a separate data storage device or as part of the memory 336 resident at the CCD 332. In an exemplary embodiment, records can be indexed and maintained by machine and/or operator.

The FOS 340 can include one or more modules configured to perform various fleet operations functions. Each module can be embodied as hardware, software, firmware or some combination thereof. By way of example, but not limitation, a module can be associated with a dedicated processing device. In a further example embodiment, a module can be configured to interact with the processor 334. By way of example, but not limitation, a module can be in the form of an application executed at the processor 334. In an example embodiment, a module can be embodied as an application service configured to cooperate with an application executed on-board the machine 105, such as a data acquisition application. In yet a further example embodiment, one or more FOS 340 modules can reside at the machine itself and be configured to interact with an onboard computer or processor, such as the processor 216.

As shown in FIG. 3, the example FOS 340 can include a status determination module (SDM) 342. The SDM 342 can be configured to receive apparatus data and use it to determine a machine status for the machine 105. In an example embodiment, machine status can be stored at the database 338 so that a record of machine status over time can be compiled. The FOS 340 can be configured to provide a report of machine status. By way of example, but not limitation, a report generating module (RGM) 346, comprising hardware, software, firmware or some combination thereof, can be configured to provide a report of machine status. In an exemplary embodiment, the RGM 346 can be configured to cooperate with one or more applications to provide a visual display of machine status as a function of time and/or location, either at a display device coupled to the FMS 330 or at a remote display device. For example, images indicating machine status can be imposed on an image depicting a geographical map to provide a visual display of machine status as a function of time and location on a display device, such as, but not limited to, a computer monitor or cell phone screen.

Figure 4:
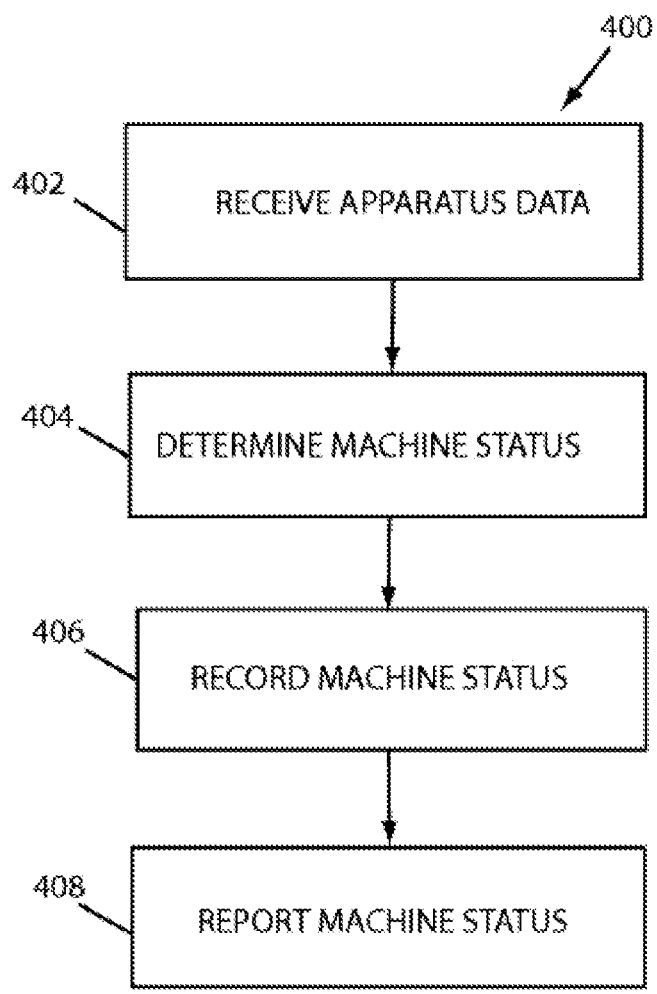
FIG. 4 depicts a flow diagram of an example method of the invention.

FIG. 4 shows a flow diagram of an example method 400 for automatic detection of machine status. At block 402, apparatus data can be received. In an example embodiment, the SDM 342 can receive apparatus data via ADU 210 transmission to the FMS 330 over the network 120. The apparatus data can include machine identification data, and can also include operator identification data. Machine location data from the positioning system 214 can be included in the apparatus data as well as apparatus data from the sensors 212, and the ECU 218. A time and date stamp can be included in each ADU 210 transmission. In an exemplary embodiment, apparatus data can be stored at the FMS 330, for example at the database 338.

Figure 5:
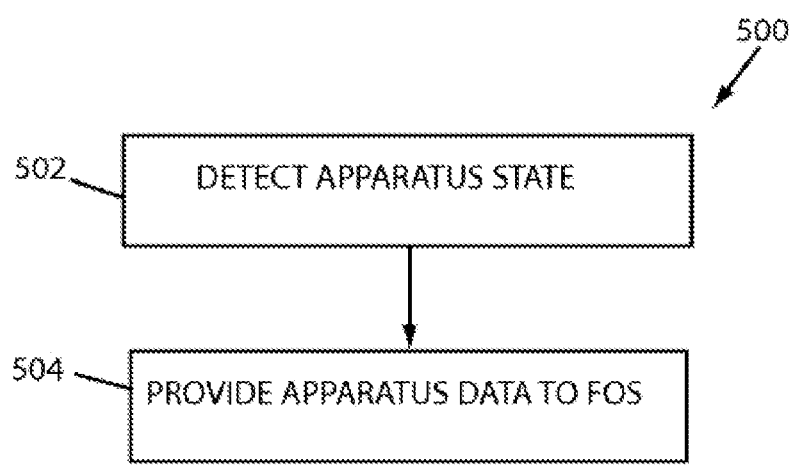
FIG. 5 depicts a flow diagram of an example method of the invention.
Figure 6:
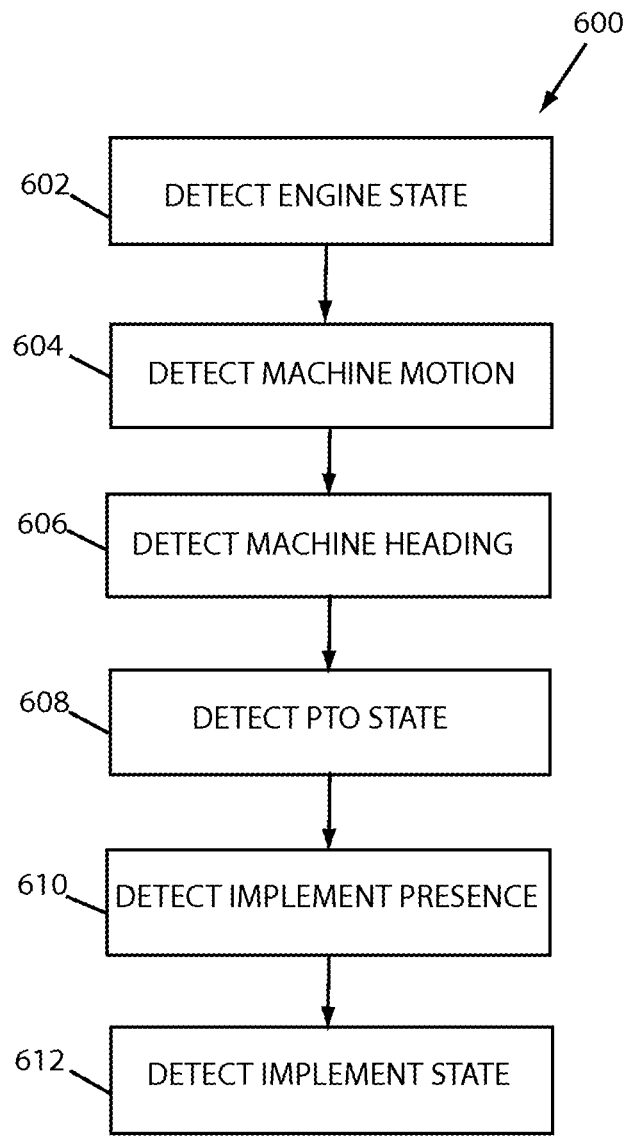
FIG. 6 depicts a flow diagram of an example method of the invention.

FIG. 5 shows a flow diagram of an example method 500 that can be practiced at the machine 105 as part of a process for determining machine status. At block 502 the apparatus state for one or more apparatus at a machine can be detected. As an example, FIG. 6 shows an example method 600 that can be practiced in the detection of apparatus state data. At block 602 machine engine state can be detected. For example an engine sensor, or the ECU 218, can detect whether an engine is operating, i.e. whether it is in an ON or OFF state and provide that state data to the ADU 210. At block 604 machine motion can be detected. For example, speed can be detected at the ECU 218 or at the positioning system 214 and provided to the ADU 210. At block 606, machine heading can be detected and provided to the ADU 210. For example, machine heading can be detected by the positioning system 214, or provided by the ECU 218. At block 608, the PTO state can be detected. For example, a sensor 212c can be configured to detect whether a PTO is operating, and provide data representing PTO state to the ADU 210. At block 610, the presence of an implement can be detected. As an example, one or more sensors 212a, 212b, ... 212n, for example a sensor 212d, can be configured to couple with an implement and provide data indicating the presence of an implement. At block 612, implement state can be detected. For example a sensor 212e, or the ECU 218, can be configured to detect whether an implement is in an active/engaged state or in an inactive/transport state and provide data representing the implement state to the ADU 210.

Returning to FIG. 5, at block 504, apparatus data can be provided to an FOS 340. In an example embodiment, the data transmitter 204 of the ADU 210 can transmit apparatus data to the FOS 340 of the FMS 330 over the communications network 120. In an exemplary embodiment, a DAM comprising hardware, software, firmware or some combination thereof, such as the DAM 222 at the machine 105, can control the acquisition and transmission of apparatus data by the ADU 210. By way of example, but not limitation, the DAM 222 can be in the form of software executed at the processor 216.

Figure 7:
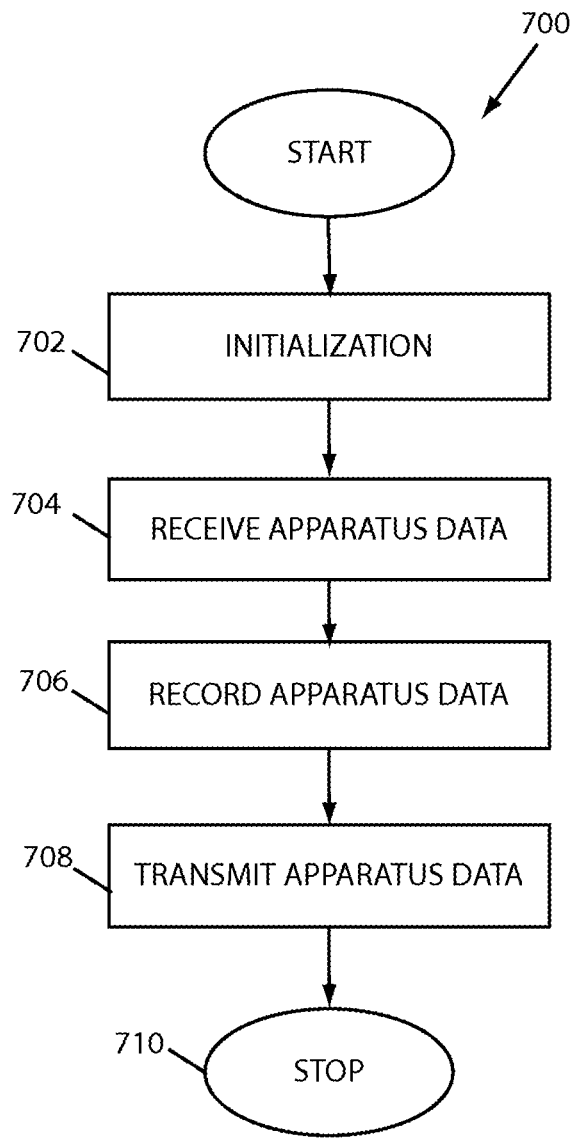
FIG. 7 depicts a flow diagram of an example method of the invention.

FIG. 7 shows an example method 700 that can be practiced in acquisition and transmission of apparatus data for the automatic determination of machine status. The method can begin in response to the satisfaction of a triggering condition, such as, but not limited to, key ON, engine ignition, or operator input. At block 702, an initialization process can be performed. Execution of this process can depend on system configuration. In an example embodiment, an initialization process can begin with a transmission from the ADU 210 to the FMS 330. By way of example, the transmission can be a request that a data acquisition application be downloaded to the machine 105. This initial request can be followed by authorization and/or billing communications pertaining to application download and service. In a further embodiment, a DAM previously resident on the machine 105 can control initialization communications transmitted by the ADU 210. The initialization communications can comprise service request, machine identification and/or operator identification, verification, configuration, or authorization messages, and/or other messages consistent with FMS 330 partitioning and communication protocols.

At block 704 apparatus data can be received at the ADU 210. In an example embodiment, a DAM can trigger activation of the various sensors 212a, 212b, . . . 212n, to provide input to the ADU 210. In a further embodiment, sensors 212, can be configured to provide input to the ADU 210 independent of a DAM. In an exemplary embodiment, a communications bus 235 communicatively couples the ADU 210 and the sensors 212, the positioning system 214, the ECU 218 and the processor 216. By way of example, but not limitation, a controller area network (CAN) bus 235 can provide connectivity between the ADU 210 and the sensors 212. In an example embodiment, the sensors 212, can be coupled to the ADU 210 via wireless transmission, direct coupling or other communicative means. An example method can include receiving apparatus data at the processor 216, at which it can be formatted for compatibility with the ADU 210 and/or the FMS 330 and then provided to the ADU 210. The ADU 210 can be configured to receive sensor input continuously, or at designated intervals, for example at intervals controlled by the DAM 222.

At block 706 apparatus data can be recorded at the ADU 210, for example at the data recorder 202. Apparatus data can be recorded as data points that include machine identification data, data from a plurality of sensors and various components in the ADU 210 operating environment, and date and time information. Operator identification can also be included.

At block 708, apparatus data can be transmitted to the FMS 330. For example, the data transmitter 204 can transmit the apparatus data stored at the data recorder 202 to the FMS 330 via the communications network 120 to provide the apparatus data to the SDM 342. In an exemplary embodiment the communications network 120 comprises a cellular network. At block 710, the process can terminate. In an example embodiment, the data acquisition and transmission process can end in response to a termination trigger, such as a key OFF state, an engine shutoff, and the like.

Referring back to FIG. 4, at block 404 machine status can be determined based on the apparatus data. In an example embodiment, the SDM 342 at the FOS 340 can be configured to designate a machine status as "Off", "Stopped/Idle", "Working", "Headland-Turning" or "Travel/Transport". A further designation of "Travel/Turning" can be included.

Figure 8:
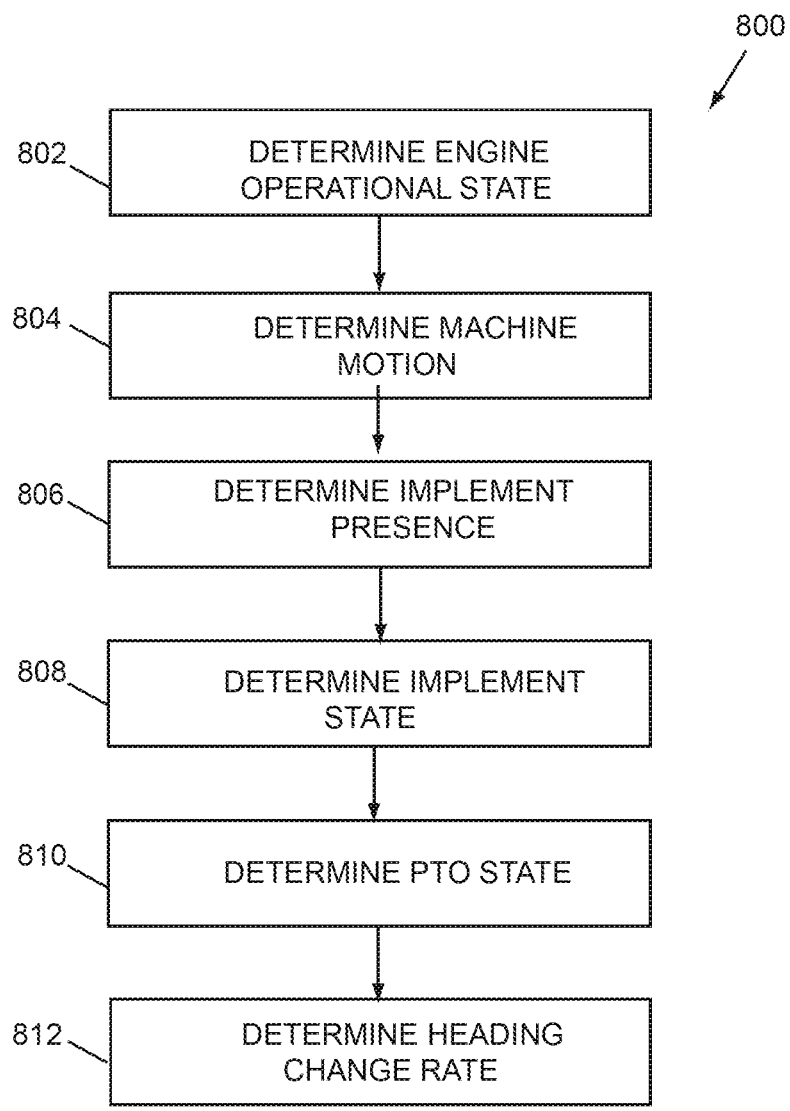
FIG. 8 depicts a flow diagram of an example method of the invention.

FIG. 8 shows a flow chart of an example method 800 that can be practiced to determine machine status at a particular time based on data received in a time-stamped ADU transmission. At block 802 a determination can be made as to whether a machine engine is operating. For example, apparatus data regarding engine state can be examined. At block 804 a determination can be made as to whether the machine is in motion. For example, apparatus data indicating speed can be used by the SDM 342 to determine whether a machine is moving or stationary. At block 806 a determination can be made as to whether an implement is present at the vehicle. Data provided by one or more sensors 212a, 212b, . . . 212n, deployed on an implement, for example the sensor 212d, can be used to make this determination. It is conceivable that a machine, such as a tractor can be equipped with an implement, but the implement is not currently in use. Accordingly, at block 808 a determination can be made as to whether an implement is engaged and/or operating. Again one or more sensors 212a, 212b, . . . 212n, for example the sensor 212d, or an additional sensor 212e disposed at the implement, can provide the input used to make a determination regarding implement state. At block 810 a determination can be made as to whether a PTO on the machine is turned on to provide power to an implement. For example a sensor 212c deployed at the PTO can provide this information; alternatively, the ECU 218 can provide input regarding PTO state. It is noted that it is conceivable that some implements may be operable without a PTO, so that PTO ON/OFF state alone may not be sufficient for determining implement state. Conversely, some implements may not be configured with sensors to detect implement state, and PTO state may be a primary or sole means of determining implement presence and state. Accordingly, the method 800 includes a check of both implement state 808 and PTO state 810, which may be redundant in some configurations.

At block 812, a determination can be made as to whether the direction of machine motion is undergoing a rapid and/or substantial change. Machine heading data can be used to make this determination. The SDM 342 can examine heading data received over time to determine whether the machine is moving in a generally constant direction, or is changing direction at a rate above a predetermined threshold, so as to determine whether a machine is performing a head-turn. Agricultural machines generally traverse a field heading in a first direction, then perform a headland-turn, essentially a 180° turn, to proceed back across the field in an opposite direction. A predetermined threshold for change in heading, and/or rate of change in heading can be established. A change in heading greater than the predetermined threshold can indicate that a headland-turn was performed.

In a further embodiment, a headland-turn can be determined from input from the ECU 218 or other system or module at the machine. It is noted that a method of the invention can contain more or fewer process blocks than shown in the example method 800, and that the process blocks can be performed in various sequences.

Figure 9:
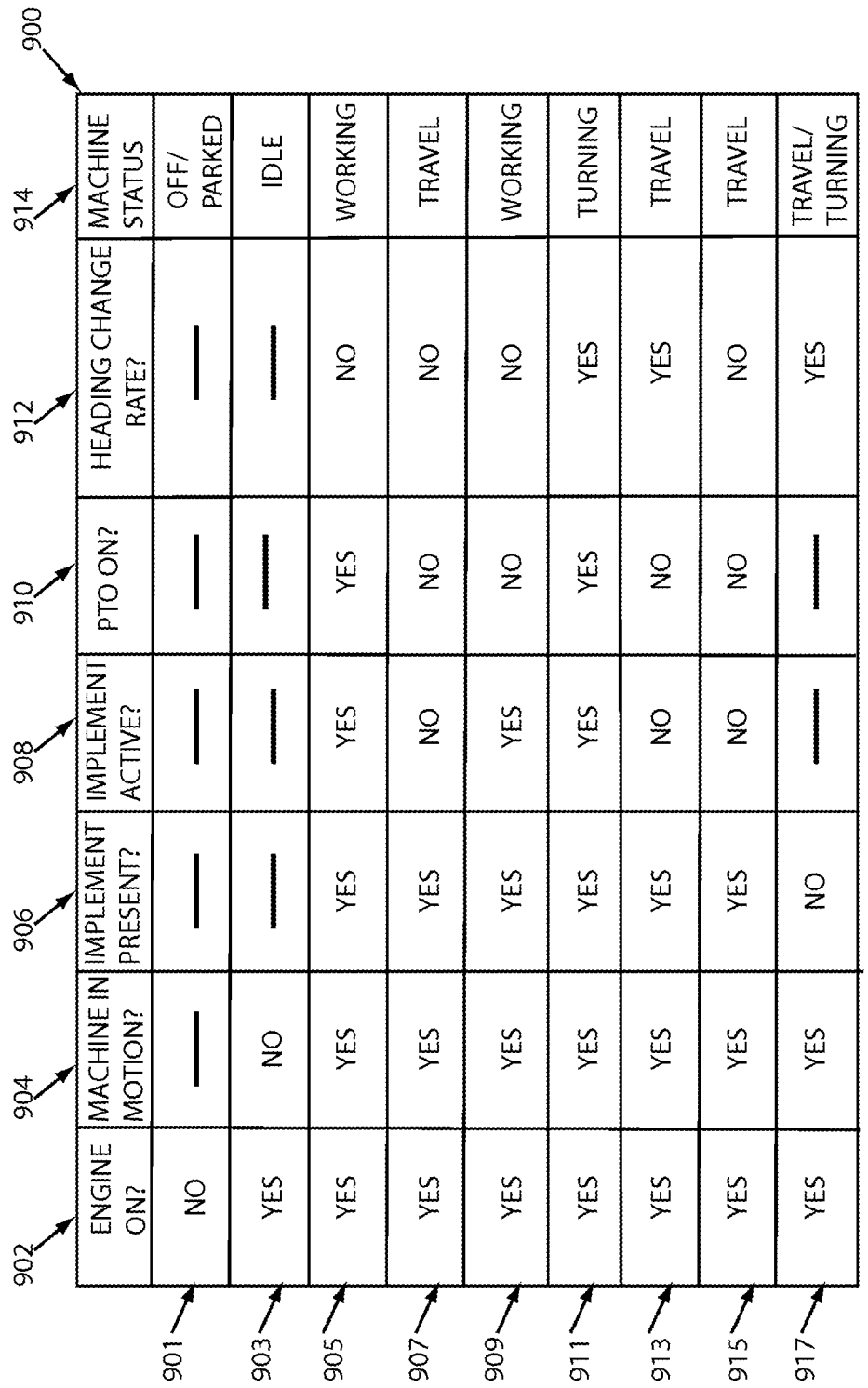
FIG. 9 depicts a chart of an example method for determining machine status.

FIG. 9 shows a diagram 900 of example logic that can be implemented by the SDM 342. The example diagram 900 shows various combinations of apparatus states and machine parameters, and example resultant machine status designations. Columns 902-912 identify various apparatus states or machine parameters that can be determined at the SDM 342 using received apparatus data, generally corresponding to steps 802-812 in the example method 800. Rows 901-917 provide various combinations of the various state determinations. Column 914 provides possible resultant machine status designations based on the various apparatus state combinations. A variety of determination schemes can be employed. For example, a scheme can be devised that takes into consideration machine type, as different agricultural vehicles can be equipped with different equipment.

Referring to Row 901, Column 902, it can be seen that if a machine engine is in an OFF state, machine status can be designated as OFF/PARKED, regardless of values in the remaining columns. In an example embodiment, detection of engine shut-off can lead to the determination that the machine is in an OFF/PARKED status. That status can be considered to continue until an engine start is detected, even if ADU transmissions cease during the parked period. Referring to row 903, when a machine engine is ON, but a machine is not in motion, machine status can be designated as IDLE. Referring to row 905, if a machine engine is ON and the machine is in motion headed in a generally constant direction with an implement present and engaged (active), and a PTO is turned ON, machine status can be designated as WORKING. However, as shown in row 911, given the same conditions, with the exception that a machine is changing direction at a rate that exceeds a predetermined threshold, machine status can be designated as HEAD-TURNING. Referring to rows 907, 917, when a machine is in motion in a generally constant direction, but an implement is either absent or not engaged, and a PTO is not engaged, machine status can be designated as TRAVELLING. Other example combinations are shown in remaining rows.

Referring back to FIG. 4, at block 406, machine status can be recorded, for example, machine status can be stored at the database 338. In an example embodiment, a record of machine status over time can be compiled and stored at the database 338. In an example embodiment, a machine status record can be indexed by machine identification and provide a sequential record that includes date, time, location, and machine status. Operator identification can further be included. In an exemplary embodiment, a record can be indexed by machine and/or operator identification.

At block 408, a report of machine status can be generated. In an example embodiment the RGM 346 can provide a machine status report in real-time or at a later time. A machine status report can be expressed in a variety of formats, including but not limited to text, graphics, or images. For example, images representing machine status at a particular time and/or location can be superimposed over a map of the field being worked by a particular machine and displayed on a display device such as a computer monitor, cell phone display screen, or other display device communicatively coupled to the FOS 340 and accessible to a fleet manager, machine operator or other interested party. By way of example, but not limitation, a machine status report can be provided by short message service (SMS) to a cellular phone device or internet capable device, by text in an e-mail application, by a text file downloaded to a computer, etc.

Figure 10:
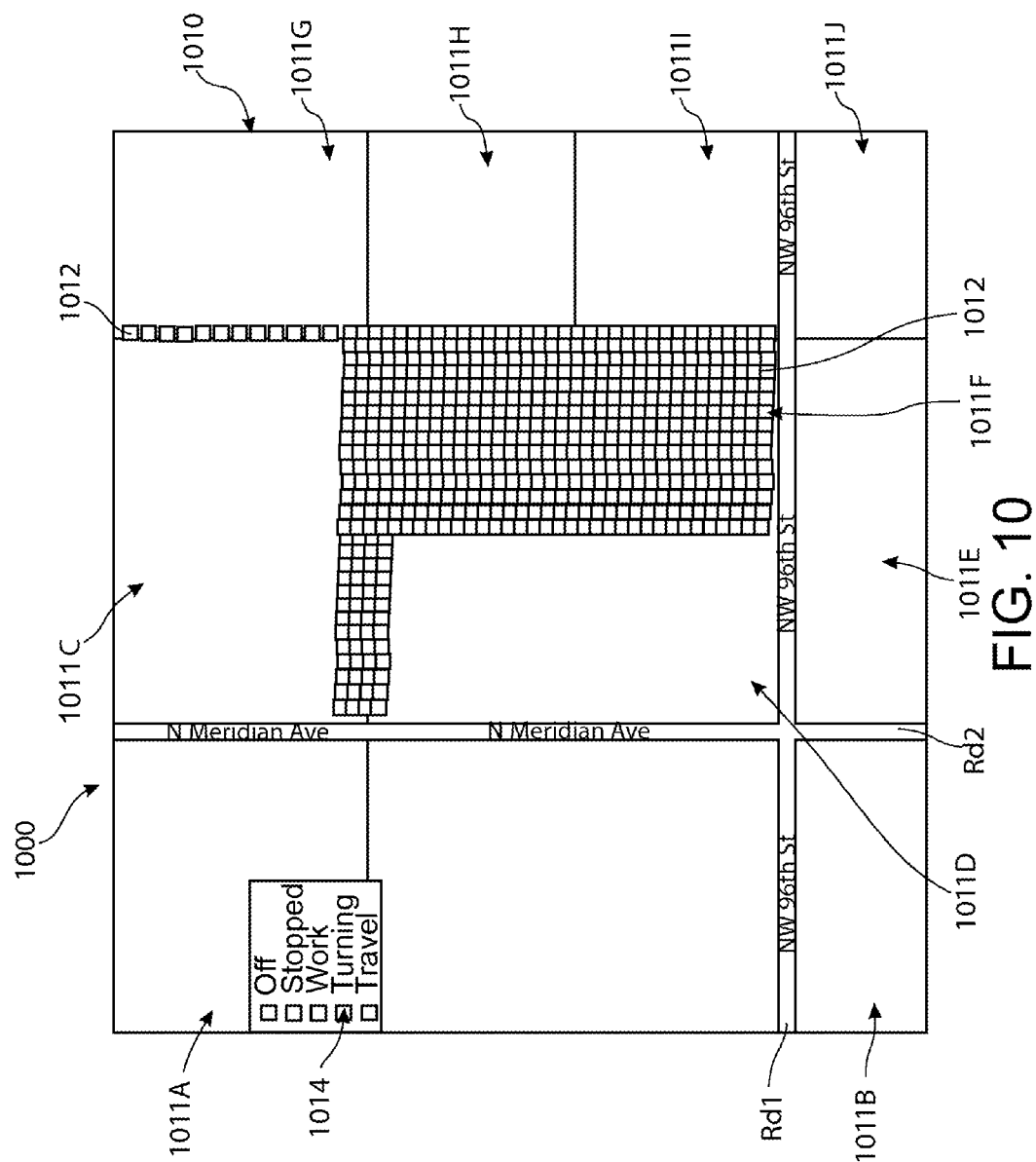
FIG. 10 depicts a screenshot of an example display showing machine status.

FIG. 10 shows a screenshot 1000 of an example display in which machine status can be reported. The display can be shown on a computer monitor, cellular device screen, machine display screen, or other display apparatus associated with a device communicatively coupled to the FOS 340 or FMS 330. In an example embodiment, the display is provided to a display screen of a device employed by a fleet manager. For example, the FMS 330 can include a display device coupled to the CCD 332 and configured to display the screenshot 1000 to a fleet manager at the FMS 330 location. In a further embodiment, a fleet manager can be positioned at a site remote from the FMS 330, in which case a display device can be coupled to a communication device communicatively coupled to the FMS 330, for example by the communications network 120.

The screenshot 1000 shows a satellite view map 1010 of a plurality of fields 1011A, 1011B, 1011C, 1011D, 1011E, 1011F, 1011G, 1011H, 10111 and 1011J, that can be separated by natural or man-made boundaries, or roads, such as roads Rd1 and Rd2. One or more machine status indicators 1012 can be superimposed on the field map to indicate machine status and location. A legend 1014 can be included to explain the way in which various statuses are portrayed by the machine status indicator 1012. In FIG. 10, the status indicator 1012 is in the form of a graphic having a generally geometric shape, a generally square shape in the current example, in which various statuses can be differentiated by infill patterns. As an example, an OFF status can be represented by the absence of a fill pattern, a STOPPED/IDLE status can be represented by a dotted infill, a WORKING status can be represented by diagonal line infill, a TURNING (HEAD-LAND-TURNING) status can be represented by cross hatched diagonal infill and a TRAVEL status can be represented by a horizontal line infill. Other infill patterns, or ways to distinguish statuses will occur to those skilled in the art. In an exemplary embodiment, the different statuses can be differentiated by indicators having different colors. For example, a geometric shape, such as a square, can be filled with a color rather than a black/white pattern. For example, an OFF status can be represented by a gray infill, a STOPPED status can be represented by a square having a red infill, a WORK status can be represented by an indicator having a dark green infill, a TURNING status can be represented by a light green infill, and a TRAVEL status can be represented with a yellow infill. In an exemplary embodiment, the colors and/or patterns employed have sufficient contrast with each other as well as the underlying map image to provide an easily ascertainable indication of machine status. Although not depicted in FIG. 10, a display can further include a machine identifier portion providing information pertaining to machine and/or operator identification and characteristics for the machine for which the status is provided.

In an example embodiment, machine status indicators 1012 can be positioned on the map 1010 to correspond with the location of a machine at the time the machine was in the indicated status or operational mode. Accordingly, as seen in FIG. 10 a machine can typically be in a HEADTURNING status at the end of a traversed row. Furthermore, as shown in FIG. 10, a first machine status indicator 1012 can overlap one or more other status indicators 1012. This can result from an actual overlapping of common ground by a machine, or simply from the size of the indicator 1012 relative to the distance between location points at which the status is determined. From FIG. 10 it can be seen that a machine status report can be in the form of images or graphics superimposed on an underlying image, such as a satellite map. An RGM can cooperate with one or more separate applications, such as a computer-based or internet-based mapping application, to provide a report of machine status. In a further embodiment, a machine status report can be embodied as a list of times, locations and corresponding machine status. Alternative forms of reports that convey machine status will be apparent to those skilled in the art.

Figure 11:
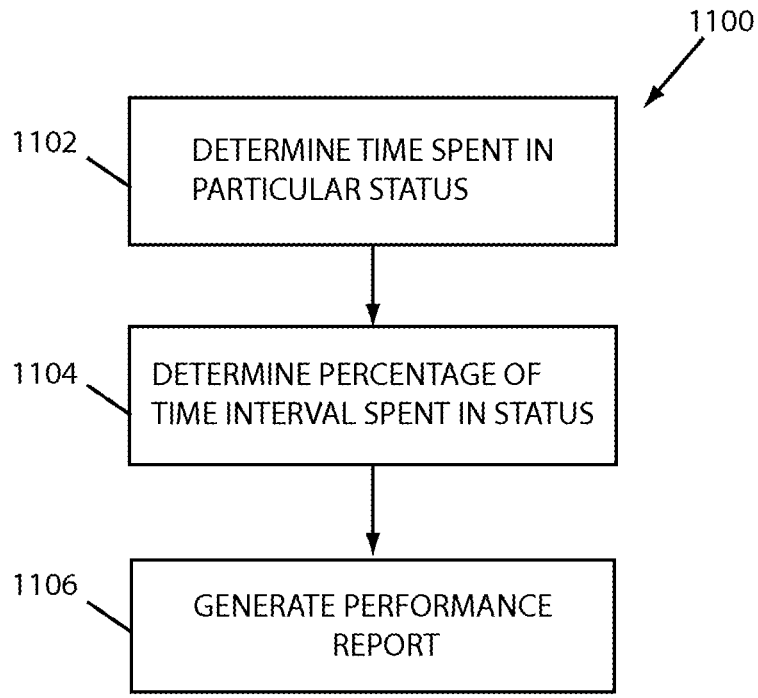
FIG. 11 shows a flow diagram of an example method 1100 for determining machine performance.

In an example embodiment, machine performance can be determined over a predetermined time period. FIG. 11 shows an example method 1100 that can be practiced to determine machine performance. In an example embodiment, the method can begin in response to satisfaction of a triggering condition, for example, upon reception of apparatus data from a machine, or in response to user input, or upon compilation of a performance record spanning 24 hours, etc. At block 1102 a determination can be made as to the amount of time a particular machine spent in a particular status. For example, a performance determination module (PDM) 344 can be configured to use data in a status record stored at the database 338 to determine the amount of time a machine spent in each status mode over a predetermined time period. In an exemplary embodiment, the predetermined time interval is stored at the PDM 344 or the memory 336. For example, the predetermined time period can be the most recent 24-hour period for which apparatus data is available. In an example embodiment, an interval can be selected by a user via a user interface that allows the FMS 330 to receive input from a user, such as a fleet manager.

At block 1104, a percentage of time spent in each status mode over the time interval can be determined. For example, the PDM 344 can be configured to make this determination by using the amount of time spent in each status and the amount of time included in the time interval. In an exemplary embodiment, the PDM 344 can be configured to generate a performance record that can be stored at the database 338. A performance record can include the time period for which it is determined, the number of hours spent in each status, and the percentage of time spent in each status over the time interval.

The PDM 344 can be configured to determine machine performance for a plurality of machines. In an exemplary embodiment, the PDM 344 can generate a performance record for each machine that can be stored at the database 338. At block 1106 a performance report based on one or more performance determinations or performance records can be generated. A performance report can present each status or operational mode that a machine exhibited over the predetermined interval, and the percentage of time spent in each status mode. In an exemplary embodiment, a performance report can report performance determinations for a plurality of machines to apprise a user, such as a fleet manager, of the performance of multiple machines in a fleet. A performance report can enable a fleet manager to compare the performance of a first machine to the performance of one or more other machines. Detection of a machine with a disappointing or unsatisfactory performance provides a fleet manager or machine operator an opportunity to make adjustments to the machine and/or operator activity to improve performance, increase revenue and decrease costs.

In an exemplary embodiment, a report generating module (RGM) 346 can generate a performance report based on the performance determination by the SDM 344 or the performance record stored at the database 338. A performance report can be provided in any form, including but not limited to, a visual display, a text file, a short-message-service message, an electronic mail message, or other form. In an example embodiment, the RGM 346 can generate a performance report that can be provided to a fleet manager over the network 120 and observed on a computer monitor, lap-top screen, smart phone screen or other display device as a visual display.

Figure 12:
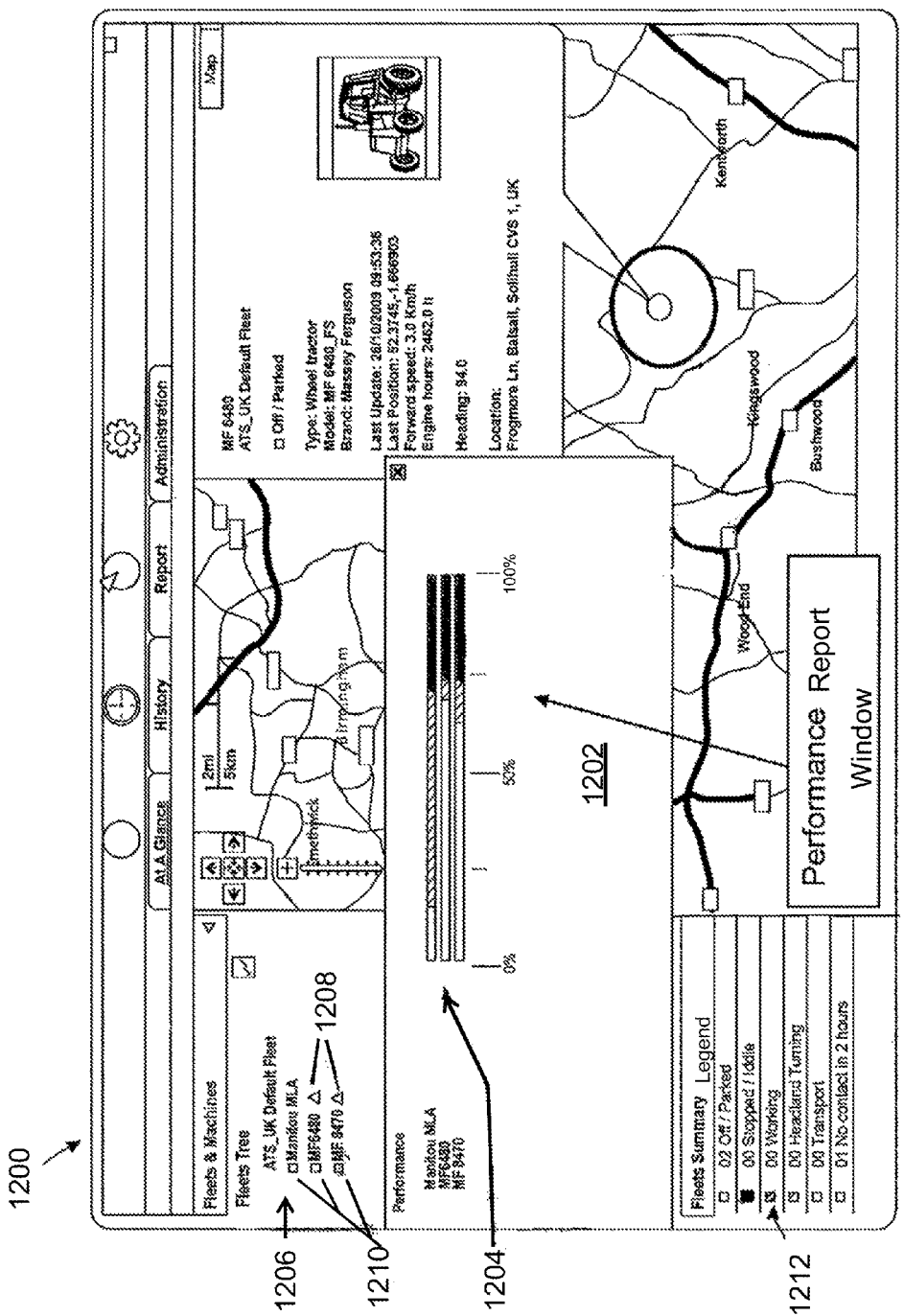
FIG. 12 depicts a screenshot of an example display showing machine performance.

FIG. 12 shows a screenshot 1200 of an example fleet management display containing a performance report 1202. The performance report 1202 includes a performance indicator 1204 that graphically represents the performance of an agricultural machine. In an exemplary embodiment, the performance indicator 1204 conveys the percentage of time that a machine spent in a particular status during a predetermined time interval. The performance indicator 1204 is embodied as a bar having differentiated portions representing the various status modes of the identified agricultural machine over a 24-hour period. The legend 1212 provides an explanation of the various patterns used to distinguish one status state from another. For example, referring to its performance indicator 1204, the agricultural machine identified as "Manitou MLA" spent about 15% of its time in a transport status, 55% of its time in a working status, and about 30% of its time in a stopped/idle status. By way of example, but not limitation, the patterns used in the performance indicator 1204 can correspond with the patterns used with the status indicator 1012 or legend 1014 in FIG. 10. As mentioned above in reference to the status indicator 1012, in an exemplary embodiment, various colors can be used to differentiate portions of the performance indicator 1204 in accordance with the colors used to indicate status in the status indicator 1012.

The performance report 1202 can be configured to provide performance indicators 1204 for a plurality of agricultural machines. Accordingly, a fleet manager can quickly assess the performance of a plurality of machines. In addition, the performance of one machine can be compared to that of other machines in a fleet to detect a sub-par performing machine. For example, referring to the performance report 1202, of the three machines listed, the MF 6480 spent the largest percentage of its time in a Travel/Transport mode, about 70%, a quarter of its time stopped, and was working the least of the machines, only about 5% of the time over the past 24 hour period. Thus, by determining the performance of a machine, and providing a performance indicator that conveys the machine's performance, the present invention allows a fleet manager to quickly detect and identify a machine and/or operator whose performance differs from that of other machines in a fleet. In response, a fleet manager can notify the machine's operator and alert him of the situation. An operator has an incentive to produce revenue. Because revenue is generated during the time a machine spends working, transport, idle and parked times can reduce the amount of revenue produced over a period. If an operator learns that he is operating at a lower revenue point than other machines in the fleet, he can consider making changes to his machine or to his operating methods. In addition, a fleet manager can consider whether adjustments need to be made to the machine itself and/or to administration and allocation of fleet resources. In a further embodiment, the FMS 330 can be configured to alert an operator whose machine is underperforming. For example, the FMS 330 can communicate an alarm to the machine 105 over the network 120.

Figure 13:
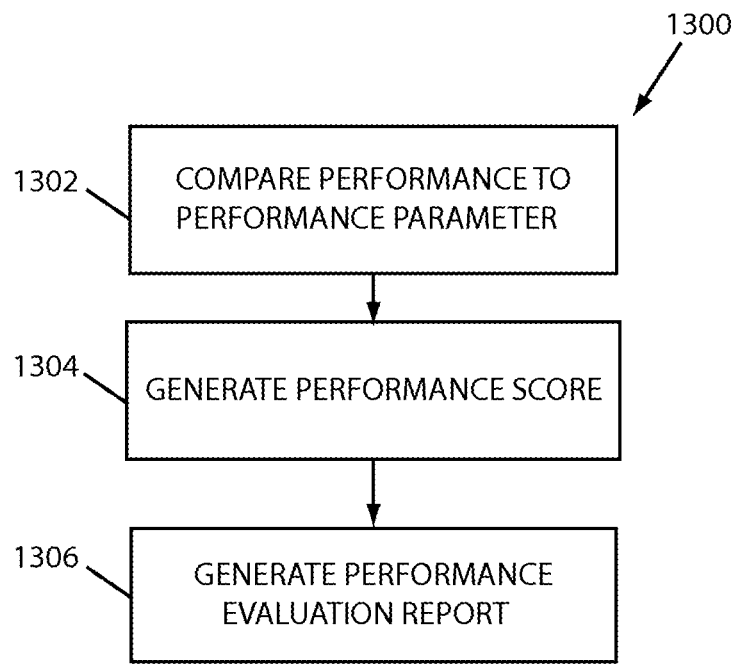
FIG. 13 shows a flow diagram of an example method for evaluating machine performance.

The FOS 340 can be configured to evaluate a machine's performance based on one or more performance standards. FIG. 13 shows an example method 1300 for evaluating a machine's performance. At block 1302, a machine's performance can be compared to at least one predetermined performance standard or performance parameter. A performance parameter can be variably defined. By way of example, but not limitation, a performance parameter can comprise a predetermined threshold, such as a percentage threshold, or number of hours threshold, for a particular status. For example, a performance parameter can comprise a working status threshold of 30%, meaning that a machine is expected to be working at least 30% of the time over the measured time interval. As a further example, a performance parameter can comprise a maximum of 12 hours for a travel/transport status, meaning that no more than 12 hours out of 24 should be spent traveling over the observed time period. One or more performance parameters can be established by setting thresholds for various machine states.

In an example embodiment, a performance parameter can comprise a fleet status or performance average, and each machine can be compared to the fleet average. For example, the PDM 344 can determine the amount of time that each machine spent in a travel/transport mode and generate a fleet average for transport time. The PDM 344 can then compare the amount of time an individual machine spent in a transport mode to the fleet average time. In a further embodiment, a separate module, such as a performance evaluation module (not shown) at an FOS 340 can be configured to perform the evaluation or comparison.

As a further example, a performance parameter can be based on the performance of a particular machine in the fleet. As one example, a particular machine, or machine of a particular operator can be selected. In a further example, the machine with the most time spent in a working status, the machine with the least time spent parked or idle, etc., can be designated as the standard for comparison. The PDM 344 can be configured to select a machine from the fleet whose performance can be used as a performance standard from which to generate one or more performance parameters to which the performance of other machines can be compared. In an exemplary embodiment, performance parameters can be stored at the PDM 344, or alternatively at the memory 336. The PDM 344 can be configured to compare a machine's performance to one or more performance parameters.

At block 1304, a performance score based on the comparison between a machine's performance and a performance parameter can be generated. In an exemplary embodiment, one or more performance scores can be associated with a machine for a particular time interval. In an example embodiment, a performance score can be expressed as one or more numerical quantities. For example, a performance score can reflect the number of performance parameters satisfied, or conversely, the number of performance parameters that were not satisfied. In a further embodiment, a performance score can be in the form of one or more qualitative, rather than quantitative, evaluations. In an example embodiment, a performance score can reflect the margin by which one or more performance parameters was not satisfied. A variety of schemes can be used to generate a performance score based the comparison of machine performance with one or more performance parameters. In an exemplary embodiment, a performance score for a particular machine over a particular time period can be stored at the database 338, for example in association with a machine performance record.

At block 1306, a report of the performance evaluation can be generated. In an exemplary embodiment, the RGM 346 can generate a report of a machine's performance evaluation, by way of example, but not limitation, by reporting its performance score. In an exemplary embodiment, a performance evaluation report 1202 can comprise a performance marker 1208, a graphic in a visual display.

The screenshot 1200 further includes an evaluation report portion 1206 that can provide a list of machines associated with a performance marker 1208. As an example, the performance marker 1208 can indicate that a machine's performance is adequate, or is below par. The performance marker 1208 can flag those machines that require additional observation, or whose operator should be contacted.

In an example embodiment, the performance marker is based on the performance score determined by the PDM 344. For example, the performance marker 1208 can be in the form of a warning symbol, such as a yellow triangle, associated with a machine operating up to a predetermined threshold, for example, 15%, below a performance parameter, like that shown associated with the MF 8470 machine. Should a machine operate at more than the 15% below the performance parameter, the performance marker 1208 can appear as an alert or alarm symbol, such as the red triangle associated with the MF 6480machine, whose time spent working was only 5%, well below a performance parameter set at 30% for time spent working. It is understood that a plurality of performance parameters can be established, and that the performance marker 1208 can be in response to a machine's performance falling below one or more of the performance parameters. The performance marker 1208 can appear in a variety of shapes and patterns to convey a variety of evaluations. By way of example, but not limitation, five performance parameters can be established, and the performance marker 1208 can be in the form of a warning symbol if a machine falls below 1 or 2 parameters, and in the form of an alarm symbol if 3 or more parameters are not satisfied. As a further example, a plurality of parameters can be prioritized and a failure to satisfy a high priority parameter can result in the performance marker 1208 appearing as an alarm symbol, while a failure to satisfy a lower priority parameter can result in the performance marker appearing in the form of a warning symbol. In a further embodiment, a performance marker 1208 can be in the form of a warning symbol when at least 2 performance parameters are not satisfied, and in the form of an alarm symbol when at least 4 parameters are not satisfied. A variety of schemes for devising performance markers 1208 can be practiced. In an example embodiment, a machine whose performance is satisfactory, or whose performance exceeds that of the remaining machines in a fleet, need not be associated with a performance marker, such as the Manitou MLA. In a further embodiment, a performance marker 1208 can be provided that conveys satisfactory performance, such as a green triangle. In an exemplary embodiment, an alarm performance marker can prompt a fleet manager to contact the operator of the machine in regard to the machine's performance. In a further embodiment, the FMS 330 can be configured to automatically contact a machine associated with an alarm performance marker indicating a poor performance score.

The evaluation report portion 1206 can also provide a current posture indicator 1210. The current posture indicator 1210 can indicate machine status, such as Idle/Stopped, Working, Transport/Travel, or Head-Turning, as well as additional states such as a Parked/Off condition, or a condition in which no machine communications have been received for a period of 2 hours or longer. In addition, a posture indicator can indicate that a current condition is unknown. By way of example, but not limitation, the posture indicator 1210 can be in the form of a geometrical shape, such as a square, with a fill pattern or fill color associated with a particular status. Thus, the evaluation report 1206 enables a fleet manager to learn at a glance the current status of a machine, and whether any machines are performing below expectations as indicated by the performance marker 1208. A warning or alarm symbol can prompt a manager to check the performance indicator 1204 to gauge the performance of a machine to see what type of problem, if any, may be occurring.

Thus, a system for automatic evaluation of machine performance can compare a machine's performance to one or more performance standards and generate a report of the comparison. In an exemplary embodiment, the report 1202 can comprise a performance marker 1208, a graphic in a visual display. An automatic evaluation system can be configured to generate a performance score based on the comparison of machine performance with performance standards, and the performance marker 1208 can represent the score. A performance marker 1208 can be in the form of a warning symbol, an alert/alarm symbol, or a satisfactory symbol to quickly apprise a fleet manager of a machine's performance with respect to desired performance standards.

An evaluation report 1202 can include performance evaluations for a plurality of machines. For example, a report 1202 can include a list of machines in a fleet and associate a performance marker 1208 with each so that a fleet manager can see how the fleet in general is performing relative to predetermined standards, and can also see how individual machines compare with one another. An evaluation report can also include current machine condition or status 1210, such as idle, traveling, working etc., or whether no recent transmissions have been received from a machine over a recent time interval. Systems and methods for performance evaluation provide a fleet manager and machine operator the opportunity to make adjustments to increase revenue, decrease costs and allocate resources more efficiently.

Although the invention has been described with reference to non-limiting example embodiments illustrated in the attached drawings, it is noted that equivalents may be employed and substitutions made herein without departing from the scope of the invention as recited in the appended claims. For example disclosed methods can be practiced in any order and steps can be added or deleted without departing from the scope of the invention. In addition functions described as performed by a particular apparatus or module may be performed by a separate or different module or apparatus. System elements disclosed as separate can be combined or reconfigured as will occur to those skilled in the art.

What is claimed:

1. A system for real-time machine performance evaluation, comprising:
    a first agricultural machine comprising—
    one or more sensors for generating apparatus data related to machine performance, and
    an apparatus data unit (ADU), the ADU configured to receive and wirelessly transmit the apparatus data over a communications network; and
    a fleet operations system (FOS) located remotely from the first agricultural machine, the FOS configured to—
    receive the apparatus data from the ADU over the communications network,
    determine a value of a performance characteristic of the first agricultural machine using the apparatus data,
    determine an average value of the performance characteristic for a plurality of agricultural machines,
    compare the value of the performance characteristic of the first agricultural machine with the average value, and
    communicate a performance report of the first agricultural machine to a user, the performance report indicating a difference between the value of the performance characteristic of the first agricultural machine and the average value.

2. The system of claim 1, wherein said FOS is configured to generate a report of said machine performance evaluation.

3. The system of claim 1, wherein said report is in the form of a visual display.

4. The system of claim 1, wherein said FOS is configured to generate a performance score for said machine based on said comparison.

5. The system of claim 4, wherein said performance score is conveyed by a performance marker graphic in a visual display.

6. The system of claim 1, wherein said FOS is configured to receive apparatus data from a plurality of said machines, and evaluate performance of said plurality of said machines.

7. The system of claim 6, wherein said FOS is configured to generate a report that conveys said performance evaluations for said plurality of said machines.

8. A method for real-time evaluation of machine performance, comprising:
    Sensing apparatus data at each of a plurality of agricultural machines using sensors on the machines;
    Wirelessly transmitting the apparatus data over a communications network to a computing device located remotely from the plurality of agricultural machines;
    using the computing device to monitor the performance of the plurality of agricultural machines and to automatically select a first machine of the plurality of agricultural machines to use as a performance standard;
    using the computing device to generate a performance standard based on the performance of the first machine,
    using a computing device to compare the performance of at least one other of the plurality of machines with the performance standard; and generating a report of said comparison.

9. The method of claim 8, further comprising providing said report to a user over a communications network.

10. The method of claim 8, wherein said report comprises a performance marker in the form of a graphic in a visual display.

11. The method of claim 10, wherein said performance marker indicates the number of performance parameters satisfied.

12. The method of claim 8, further comprising generating a performance score.

13. The method of claim 12, wherein said performance score is conveyed to a user by a performance marker in the form of a graphic in a visual display.

14. The method of claim 13, wherein said performance score is based on said machine's performance over a predetermined time period.

15. The method of claim 14, wherein said predetermined time period comprises the most recent 24 hours for which apparatus data has been received from said at least one machine.

16. The method of claim 15, wherein said performance score conveys the degree to which a performance parameter failed to be satisfied.

* * * * *